United States Patent [19]

Fleming

[11] Patent Number: 4,534,587
[45] Date of Patent: Aug. 13, 1985

[54] LATCH ASSEMBLY

[75] Inventor: Paul D. Fleming, Glendale, Calif.

[73] Assignee: W & F Manufacturing, Inc., Glendale, Calif.

[21] Appl. No.: 462,020

[22] Filed: Jan. 28, 1983

[51] Int. Cl.³ .............................................. E05C 17/32
[52] U.S. Cl. ................... 292/263; 292/DIG. 5; 49/394; 49/465; 296/224
[58] Field of Search ............... 292/DIG. 5, DIG. 31, 292/DIG. 49, DIG. 62, 263, 108, 128, 103, 113, 153, 210, 204, 338; 49/394, 465; 296/218, 224; 16/282, 288, 294, 302, 366

[56] References Cited

U.S. PATENT DOCUMENTS

| 1,382,322 | 6/1921 | Schleicher | 292/113 |
| 2,475,131 | 7/1949 | Edwards et al. | 292/263 |
| 3,261,051 | 7/1966 | Priest | 16/288 X |
| 3,363,281 | 1/1968 | Borsani | 16/288 |
| 3,881,758 | 5/1975 | Gross | 292/128 X |
| 3,905,625 | 9/1975 | Bryant | 292/128 |
| 3,974,753 | 8/1976 | Blomgren et al. | 292/263 X |
| 4,067,605 | 1/1978 | Green et al. | 292/263 X |
| 4,120,524 | 10/1978 | Buck, Jr. | 292/263 |
| 4,134,281 | 1/1979 | Pelcin | 292/210 X |
| 4,161,336 | 7/1979 | LeVan et al. | 296/218 |
| 4,183,576 | 1/1980 | Frymire | 296/212 |
| 4,186,525 | 2/1980 | Carvelho | 49/465 |
| 4,193,628 | 3/1980 | Sorensen | 49/465 X |
| 4,205,875 | 6/1980 | Smith | 296/218 |
| 4,216,983 | 8/1980 | Hough et al. | 292/263 |
| 4,244,611 | 1/1981 | Wahoski | 292/113 |
| 4,257,632 | 3/1981 | DeStepheno | 292/263 |
| 4,364,600 | 12/1982 | Hauber | 296/218 |
| 4,422,689 | 12/1983 | Yamamoto et al. | 49/465 X |

Primary Examiner—Gary L. Smith
Assistant Examiner—Thomas J. Dubnicka
Attorney, Agent, or Firm—Fulwider, Patton, Rieber, Lee & Utecht

[57] ABSTRACT

An improved latch assembly is provided particularly for use in so-called sunroof windows or the like in an automotive vehicle to movably position a vent panel, such as a pane of glass, to selectively open and close a vent opening. The latch assembly comprises at least one pair of mechanical links pivoted to each other and respectively pivoted to the vent panel and a stationary main frame at one side of the vent opening. The links are designed for articulated movement generally over-center relative to each other between a first position holding a latch in locking engagement with a keeper on the main frame thereby locking the vent panel in a closed position and a second position supporting the vent panel in an open position relative to the vent opening. This over-center pivoting movement is facilitated by forming one of the links from a telescoping pair of link sections for lost motion in response to reaction forces during pivoting thereby substantially reducing the magnitude of forces acting between the main frame and the vent panel which could otherwise cause distortion and/or damage thereto.

35 Claims, 16 Drawing Figures

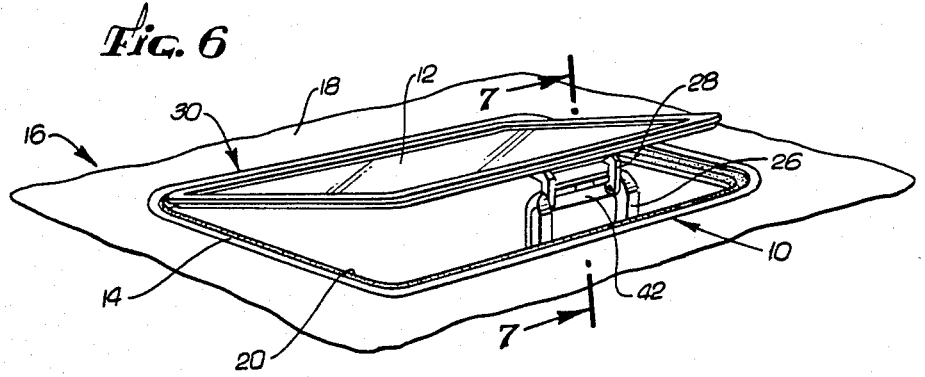
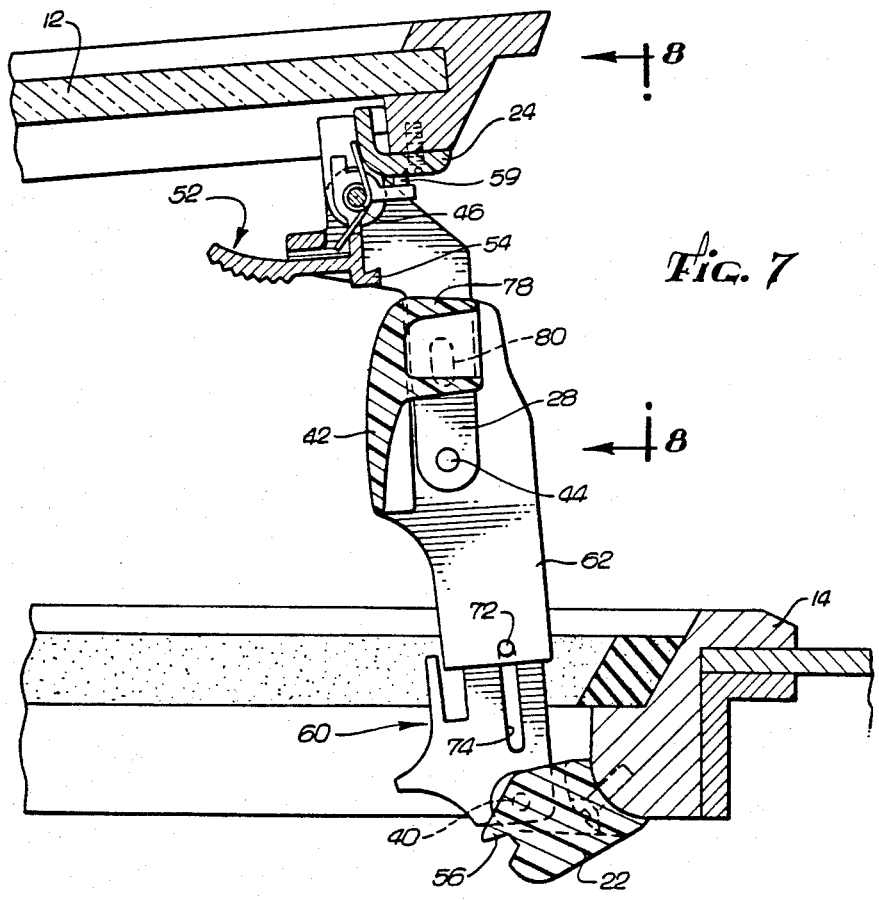

4,534,587

LATCH ASSEMBLY

BACKGROUND OF THE INVENTION

This invention relates generally to latches and latch assemblies for use in opening and closing vent apparatus. More particularly, this invention relates to an improved over-center type latch assembly, such as those designed particularly for use in sunroof windows or the like in an automotive vehicle, for locking and unlocking a vent panel relative to a stationary main frame.

Over-center type latches are commonly used for locking and unlocking two components mechanically movable relative to each other. For example, over-center type latches are used widely in windows, such as so-called sunroof or moonroof windows in automotive vehicles, wherein a vent panel, typically a pane of glass, is pivotally movable about a hinge along one edge with respect to a stationary frame between a closed position lying substantially within the plane of the frame and an open position supported angularly to the frame to permit air flow through a vent opening. The latch is typically mounted at or near the edge of the vent panel opposite the hinge and includes a pair of mechanical links pivotally connected to each other and respectively pivoted to the frame and to the vent panel. These latch links are designed to pivot through an articulated path of motion moving one link over-center relative to the other for movement between a locked position holding the vent panel closed and an unlocked position permitting swinging movement of the panel to the open position.

One inherent problem encountered with over-center latches of this general type, however, is that relatively large mechanical reaction forces are typically applied to the vent panel and the frame as the latch links are pivoted between the open and closed positions. These mechanical forces act with significant magnitude generally in the plane of the frame and tend to spread the edges of the vent panel and frame adjacent the latch away from one another each time the window is opened or closed. Unfortunately, in a sunroof window for installation into an automotive vehicle, the frame is constructed preferably from a lightweight material, such as aluminum, for minimum weight addition to the vehicle, whereby these mechanical reaction forces can cause deformation of the frame sufficient to prevent proper window operation or to permit leakage of water or the like when the window is closed.

A further disadvantage encountered with many conventional over-center type latches particularly when used with a vehicle sunroof is that the latch links tend to occupy objectionable amounts of passenger headroom within the vehicle both during pivoting movement to the closed position as well as after the window is fully closed. This obstruction of passenger headroom is highly undesirable especially in modern compact vehicles in which headroom is already severely limited. Moreover, the presence of latch structures protruding downwardly into the passenger compartment can present risk of significant head injuries in the event the vehicle is involved in a collision.

There exists, therefore, a significant need for an improved yet relatively simple and easy-to-operate latch assembly designed particularly for use with sunroof windows or the like in automotive vehicles wherein the latch assembly can be operated to open and close the window without applying significant mechanical forces to the window and further wherein the latch assembly provides a relatively low profile at all times to minimize restriction to passenger headroom.

SUMMARY OF THE INVENTION

In accordance with the invention, an improved over-center type latch assembly is provided for use in moving two mechanical members between first and second positions relative to one another, such as a vent panel relative to a stationary main frame in, for example, a so-called sunroof window or the like for use in an automotive vehicle. The latch assembly controls movement of the vent panel between a closed and locked position lying substantially within the plane of the main frame to close a vent opening defined by the main frame and an open position tilted angularly relative to the main frame to admit air through the vent opening. The latch assembly of this invention includes over-center pivoting mechanical links incorporating sufficient lost motion to permit opening and closing movement of the vent panel with relatively minimum reaction forces acting generally in the plane of the main frame which could otherwise result in distortion and/or damage to the main frame. In addition, the latch assembly is designed for operation quickly and easily from within the passenger compartment of a vehicle and assumes a relatively low profile lying closely adjacent the vent panel in the closed and locked position to avoid undue obstruction of passenger headroom.

In accordance with a presently preferred form of the invention, the latch assembly comprises two pairs of mechanical links wherein the links of each pair are pivoted to one another and respectively pivoted to a frame bracket secured to the main frame and a panel bracket secured with respect to the vent panel. The pairs of mechanical links are joined by a handle member for simultaneous pivoting movement over-center relative to each other between a first position folded generally into a common plane lying closely adjacent the vent panel substantially within the plane of the main frame to hold the vent panel in a position closing the vent opening, and a second position extending upwardly in generally end-to-end relation to tilt the vent panel upwardly relative to the main frame thereby admitting air into the passenger compartment through the vent opening. In the first position, a latch carried by the panel bracket is moved into locking engagement with a keeper on the frame bracket to lock the vent panel in the closed position. To unlock the vent panel, the latch is pivoted relative to the panel bracket away from locking engagement with the keeper to permit pivoting movement of the mechanical links toward the second, open position.

In accordance with one primary aspect of the invention, each pair of the mechanical links includes at least one link defined by telescopically interfitting sections biased by a spring toward a normal extended position. This link construction provides lost motion along the longitudinal axis of the link to permit the link to vary in length during pivoting movement as the vent panel is moved between the open and closed positions. With this construction, substantial reaction forces encountered during such movement are accommodated by length variation of the telescopic links to limit transfer of those forces to the vent panel and the main frame in accordance with the strength of the spring. This significantly reduces the magnitude of the reaction forces applied to the vent panel and main frame to correspondingly avoid distortion and/or damage thereto during use.

In accordance with a further feature of the invention, the mechanical links are designed for pivoting movement directly between the first and second positions without projecting downwardly into the passenger compartment thereby avoiding obstruction of passenger headroom. Moreover, when the links are moved from the open position to the closed position, a substantially downward force may be applied to the panel bracket to positively pull the latch into locking engagement with the keeper on the frame bracket. This downward force is applied by pivoting the mechanical links downwardly beyond their folded, first position to a position generally perpendicular to the plane of the main frame and then with a continuous motion pulling downwardly on the links to pull the latch into engagement with the keeper. Importantly, this downward pivoting movement is accompanied by compression of the biasing springs within the telescopic links, such that when the links are released after latching, these biasing springs urge the links back toward their low-profile, folded first position whereby headroom obstruction occurs only momentarily.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 6 is a fragmented perspective view of the sunroof window of FIG. 1, as viewed from outside the passenger compartment and illustrating the latch assembly in an open position;

FIG. 7 is an enlarged fragmented vertical section of the latch assembly taken generally on the line 7—7 of FIG. 6 and illustrating the latch assembly in an open position;

DETAILED DESCRIPTION OF THE PREFERRED EMBODIMENT

Figure 1:
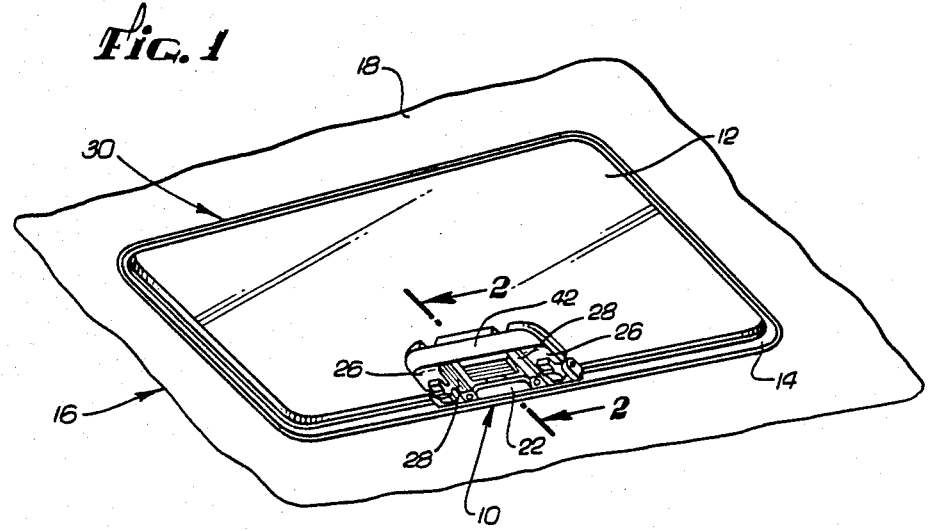
FIG. 1 is a fragmented perspective view illustrating a so-called sunroof window as viewed from within the passenger compartment of a vehicle and including a latch assembly embodying the novel features of the present invention.

As shown in the exemplary drawings, a latch assembly referred to generally by the reference numeral 10 is provided for controlling movement of a vent panel 12 between open and closed positions relative to a stationary main frame 14. While the latch assembly 10 may be used in conjunction with a variety of relatively movable mechanical structures, the latch assembly is designed particularly as shown in the exemplary drawings for use with a so-called sunroof window 16 of the type commonly installed into the roof 18 of an automotive vehicle or the like. In operation, articulated mechanical links forming a part of the latch assembly 10 are pivotally movable over-center relative to one another for moving the vent panel 12 between a closed and locked position lying generally within the plane of the main frame 14, as viewed in FIG. 1, and an open position with the rear edge of the vent panel 12 tilted upwardly from the main frame 14 to admit air and light through a vent opening 20 defined by the main frame 14, as viewed in FIG. 6.

The latch assembly 10 of this invention provides a significant improvement upon over-center type latch assemblies commonly used in sunroof windows and the like in that mechanical reaction forces encountered during movement of the articulated links between over-center positions is controlled and limited in a manner to prevent distortion and/or damage to the main frame 14 and the vent panel 12 which could otherwise result from such reaction forces. More specifically, conventional over-center type latch assemblies inherently impose relatively high reaction forces between, in the case of a sunroof window, the vent panel 12 and main frame 14 wherein these reaction forces are particularly significant in the plane of the main frame 14. Since it is highly desirable to manufacture the sunroof window from lightweight components to minimize cost and weight addition to the vehicle, the resultant main frame 14 and any frame which may be provided about the vent panel 12 are highly susceptible to distortion and/or breakage in response to the reaction forces during over-center pivoting movement of the articulated links. In the present invention, however, the reaction forces are minimized and limited to prevent such distortion and/or damage while at the same time providing a latch assembly adapted for construction primarily from inexpensive materials, such as a rigid plastic, and which is easy to operate and avoids undue obstruction of the passenger compartment of a vehicle.

The latch assembly 10 of this invention is designed for use with a sunroof 16 of any conventional form and construction including the main frame 14 secured in any appropriate manner to the roof 18 of the vehicle and peripherally bounding a hatchlike vent opening 20 formed in the vehicle roof. The vent panel 12 comprises a generally planar vent covering member, typically formed from a transparent or transluscent pane of glass or acrylic with a size and shape to fit relatively closely within the vent opening. This vent panel 12 is conventionally hinged along a forward edge, referred to generally by arrow 30 in FIGS. 1 and 6, to the main frame 14 by a hinge (not shown) of any suitable construction thereby permitting hinged movement of the vent panel 12 between a closed position lying substantially within the plane of the main frame 14, as viewed in FIG. 1, and an open position tilted upwardly from the frame plane, as viewed in FIG. 6, to admit light and air into the passenger compartment below. In the illustrative sunroof, the vent panel 12 is bordered by a peripheral vent frame 32 to which the panel bracket 24 is secured and which partially crushes a peripheral sealing gasket 34 carried by the main frame 14 to seal the vent opening when the vent panel is closed, as shown best in FIG. 2. Alternatively, in accordance with other conventional sunroof window constructions, the vent frame 32 may be omitted and the panel bracket 24 may be secured directly to the vent panel 12, in which case the peripheral edge of the vent panel 12 cooperates directly with the sealing gasket 34 to seal the vent opening when the vent panel is in the closed position.

The latch assembly 10 of this invention is shown in detail in one preferred form in FIGS. 1–12. As shown, the latch assembly 10 generally comprises a frame bracket 22 adapted for connection to the main frame 14 at a generally centered location along the rear edge of the vent opening 20 opposite the hinged edge 30, and a panel bracket 24 adapted for connection with respect to the vent panel 12 in a position generally adjacent the frame bracket 22. A transversely spaced pair of frame links 26 are pivoted at one end to the frame bracket 22 and generally at their opposite ends to adjacent ends of a respective pair of panel links 28. The panel links, in turn, have their opposite ends pivotally connected to the vent bracket 24 such that the frame and panel links 26 and 28 define articulated mechanical links designed for over-center movement relative to each other, as will be described in more detail, for controlled movement of the vent panel 12 between closed and opened positions.

Figure 2:
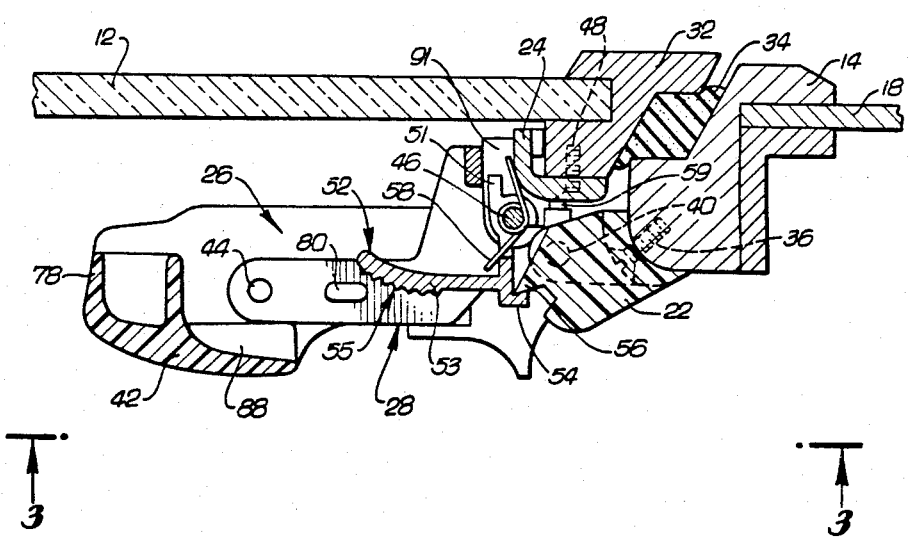
FIG. 2 is an enlarged fragmented vertical section of the latch assembly taken generally on the line 2—2 of FIG. 1 and illustrating the latch assembly in a closed and locked position.
Figure 3:
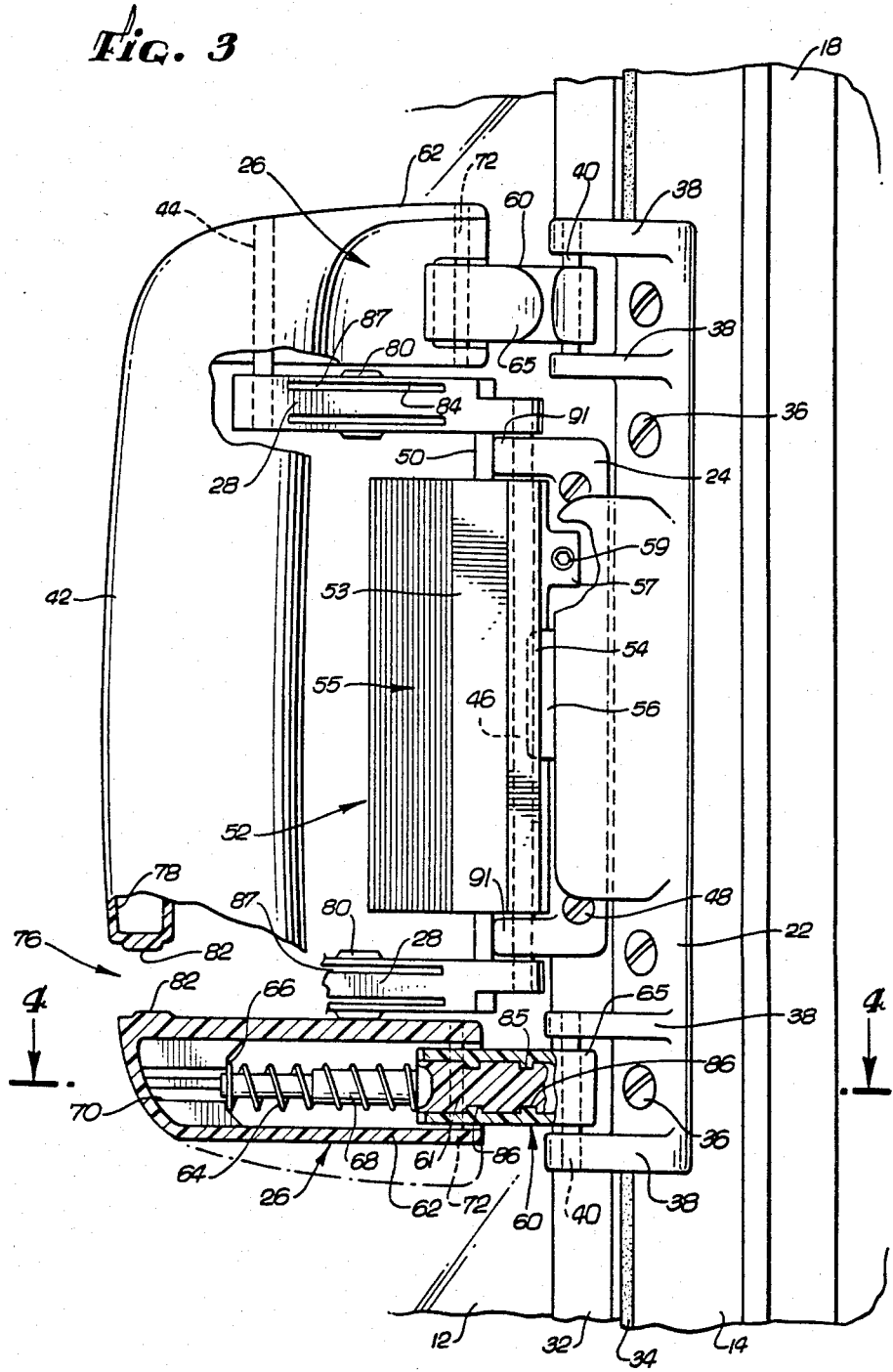
FIG. 3 is a fragmented bottom plan view of the latch assembly taken generally on the line 3—3 of FIG. 2, with portions broken away to illustrate details of construction.
Figure 4:
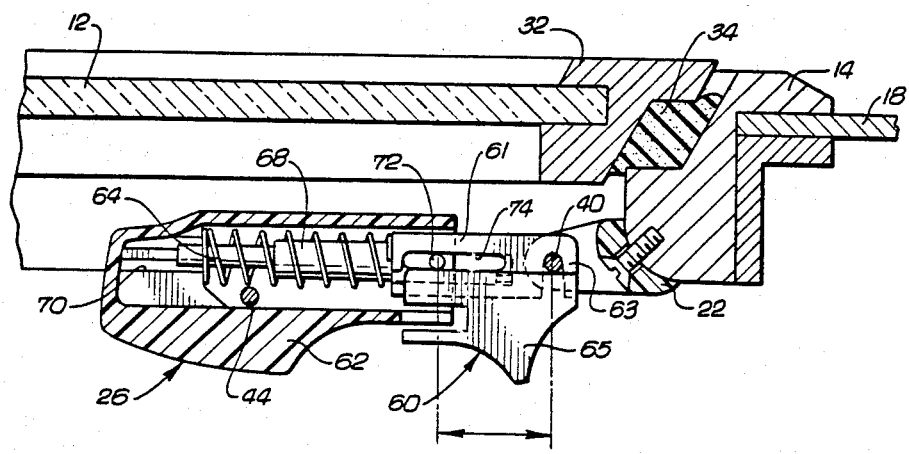
FIG. 4 is a fragmented vertical section of the latch assembly taken generally on the line 4—4 of FIG. 3.

As shown best in FIGS. 2–4, the frame bracket 22 comprises a transversely elongated bracket strip contoured to fit snugly against the main frame 14 and for rigid attachment of the frame bracket as by means of a plurality of screws 36 or the like. The frame bracket 22 is positioned within the passenger compartment of the vehicle at a position spaced slightly below the sealing gasket 34 and thus also slightly below the vent panel 12 when the vent panel is in the closed position, as viewed in FIGS. 2 and 4. The opposite ends of the frame bracket 22 includes transversely spaced pairs of relatively short integral support arms 38 projecting generally into the vent opening 20 and each pair respectively supports a relatively short pintle 40 which may be formed from metal or the like and is sized for press-fitting into appropriate holes formed in the support arms 38.

The pintles 40, which are oriented on a common transverse axis, are captured respectively by the adjacent ends of the two frame links 26 which extend away from the frame bracket 22 generally in parallel with one another. The opposite ends of these frame links 26 are joined together, in the illustrative embodiment, by an integrally molded handle member 42 extending transversely therebetween. This handle member 42 provides an easily grasped structure which can be manipulated manually from within the passenger compartment of the vehicle to operate the latch assembly 10 of this invention, as will be described in more detail.

As shown best in FIGS. 2 and 3, the frame links 26 support respectively on a common transverse axis a pair of hinge pins 44 which, like the pintles 40, may be formed from metal or the like for press-fitting into appropriate holes in the frame links 26 near the handle member 42. These hinge pins 44 project from the frame links 26 in inboard directions toward each other for pivotal connection respectively to adjacent ends of the panel links 28 lying alongside the inboard faces of the frame links 26, as shown in FIG. 3. From the hinge pins 44, the panel links 28 extend in parallel for connection of their opposite ends to a pivot shaft 46 which in turn pivotally supports the panel bracket 24 shown secured to the vent frame 32 of the vent panel 12 by a pair of screws 48 or the like. Conveniently, for added structural rigidity, the ends of the panel links 28 adjacent the panel bracket 24 are further interconnected by an integrally molded cross bar 50.

When the vent panel 12 is in the closed position, as shown in FIG. 2, the latch assembly 10 is locked in the closed position against upward movement of the vent panel 12 by a latch 54 formed on a latch plate 52 carried by the pivot shaft 46 for movement with the panel bracket 24. More specifically, this latch plate 52 comprises a transversely elongated extrusion of metal or the like sized to fit between the panel links 28 and having a generally L-shaped cross section with an upper leg 51 pivotally supported by the pivot shaft 46 and a lower leg 53 projecting a short distance generally into the vent opening. The latch 54 is formed at the juncture of the upper and lower legs 51 and 53 and comprises a transversely elongated strip of hooklike cross section projecting generally toward the frame bracket 22 to engage the underside of a downwardly and forwardly directed latch keeper 56 formed integrally on the frame bracket 22 between the sets of support arms 38. A torsion spring 58 wrapped about the pivot shaft 46 has opposite ends respectively engaging the panel bracket 24 and the latch plate 52 to bias the latch plate for pivoting movement about the pivot shaft 46 toward a normal position with the latch 54 disposed for locking engagement with the keeper 56, and a tab 57 projecting rearwardly from the upper leg 51 of the latch plate 52 supports a threaded set screw 59 which may be selectively advanced upwardly to contact the panel bracket 24 to define the normal position to which the latch is biased.

When it is desired to move the vent panel 12 to the open position, the latch 54 is quickly and easily disengaged from the keeper 56 by pressing upwardly on the lower leg 53 of the latch plate to pivot the latch plate against the torsion spring 58 thereby retracting the latch 54 from the keeper 56. Conveniently, such pivoting movement of the latch plate 52 is facilitated by providing a textured nonskid surface 55 on the lower leg 53. When the latch 54 is disengaged from the keeper 56, the sealing gasket 34 normally expands slightly but sufficiently to carry the latch 54 upwardly a short distance where it does not reengage the keeper 56.

Figure 8:
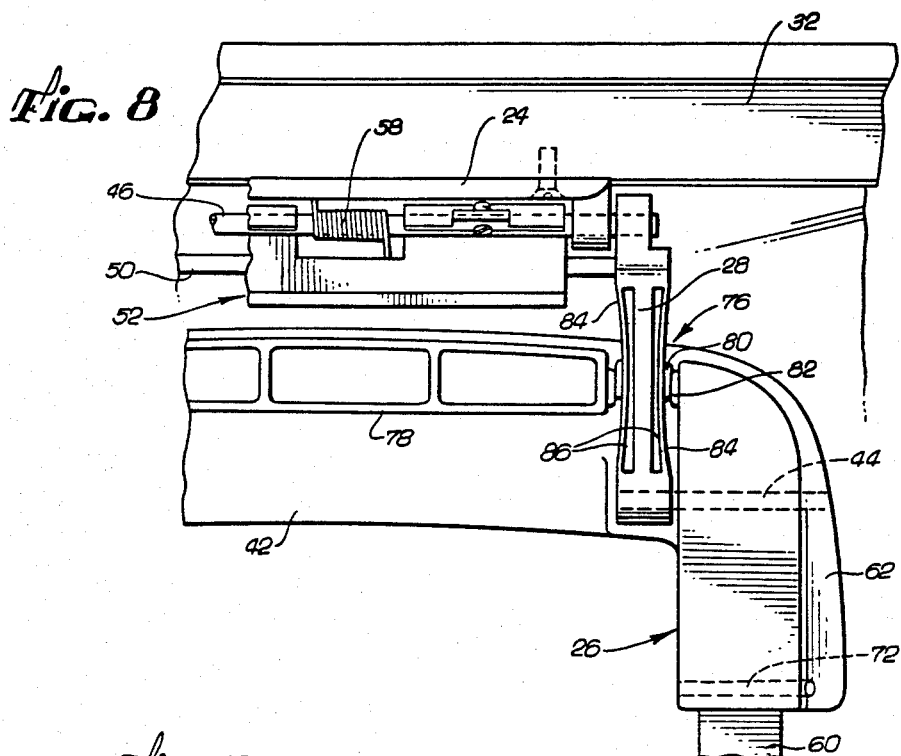
FIG. 8 is a fragmented elevation view of the latch assembly taken generally on the line 8—8 of FIG. 7.
Figure 12:
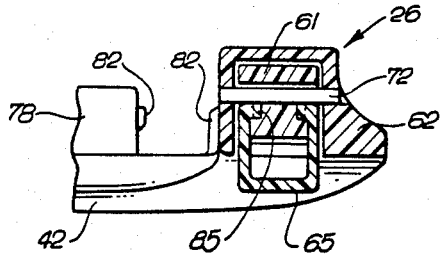
FIG. 12 is a fragmented vertical section of a portion of the latch assembly taken generally on the line 12—12 of FIG. 11.
Figure 11:
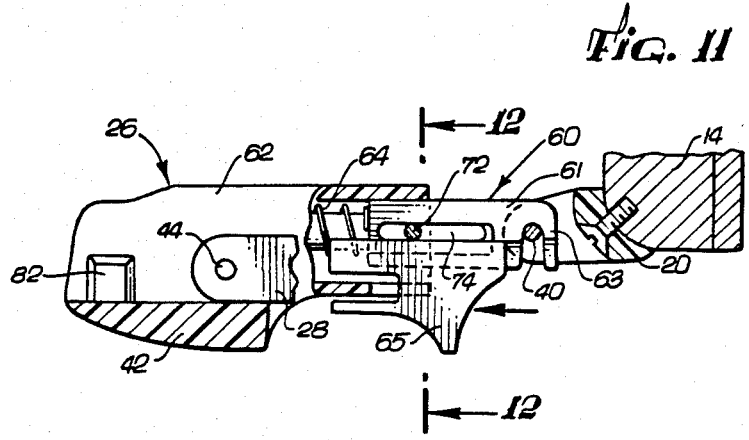
FIG. 11 is a fragmented vertical section of the latch assembly generally similar to portions of FIG. 4, with portions broken away to illustrate uncoupling of the latch assembly for disassembly of the sunroof window.

When unlatched, the pivotally interconnected pairs of frame links 26 and panel links 28 are, as a result of their respective shapes and the relative positions of their axes of rotation, movable back and forth between the closed position shown in FIGS. 2–4 and the open position shown in FIGS. 6–8. More particularly, in the illustrative embodiment, the distance between the pivot axis of the panel links 28 relative to the panel bracket 24, as defined by the pivot shaft 46, is located at least slightly above the pivot axes of the frame links 26 relative to the frame bracket 22, as defined by the pintles 40, when the latch assembly is in the closed position, irrespective of the position of the latch 54. With this construction, when the latch 54 is disengaged from the keeper 56, an upward force applied to the handle member 42 pivots the frame links 26 upwardly about the pintles 40 and simultaneously carries the panel links 28 upwardly and pivots those links 28 in a rotational direction opposite the frame links 26 thereby moving the frame and panel links from a substantially folded orientation in the closed position to a substantially end-to-end, extended orientation in the open position. Importantly, movement toward the open position continues until the panel links 28 contact the handle member 42, as shown in FIG. 7, and this contact does not occur by virtue of the relative link shapes until the panel links 28 move over-center relative to the frame links 26 such that the weight of the vent panel 12 bearing on the links maintains said links in the open position.

In accordance with a primary feature of the latch assembly 10 of the present invention, the frame links 26 are formed from telescoping sections to accommodate a limited range of lost motion and thereby permit adjustment in the effective lengths of the frame links during movement from the closed position as shown in FIG. 2 to the open position as shown in FIG. 7. This limited lost motion accommodates relatively high reaction forces which otherwise inherently occur in an over-center type latch assembly wherein the links necessarily are required to rotate about pivot axes not located on common centers. Accommodation of these reaction forces effectively limits force transfer to the vent frame 32 or the main frame 14 to prevent distortion and/or damage thereto as the sunroof window is opened and closed.

More particularly, with specific reference to FIGS. 3 and 4, each frame link 26 includes an inner section 60 having one end pivotally connected to the associated pintle 40 on the frame bracket 22 and an opposite end received telescopically into an open-ended outer section 62 pivoted to the associated panel link 28. A compression spring 64 is carried within the outer section 62 of the frame link and reacts between a shoulder 66 within the outer section 62 and the free end of the inner section 60 thereby biasing the telescopic frame link 26 toward a normal extended position of maximum length. A guide rod 68 conveniently locates and carries the compression spring 64 and has one end bearing against the inner section 60 and an opposite end defined by a stem of narrowed cross section slidable into a relatively small recess 70 formed within the outer section 62. In addition, a transverse retainer pin 72 carried by the outer section 62 extends through a longitudinally elongated slot 74 in the inner section 60 wherein the length of the slot 74 defines permissible limits of relative telescopic motion between the link section.

When the vent panel 12 is in the closed position, as shown in FIGS. 2 and 4, the lengths of panel links 28 function to partially compress the compression springs 64 within the frame links 26 thereby retaining the frame links 26 in a slightly retracted condition, as shown best in FIG. 4. However, when the latch 54 is disengaged from the keeper 56, as described previously, the handle member 42 may be lifted to move the frame and panel links 26 and 28 toward the open position. During initial portions of this movement, when the mechanical advantage for rotating the links toward the open position is relatively low, the compression springs 64 urge the frame links 26 toward a fully extended position, as viewed in FIG. 5, thereby assisting initial upward pivoting movement, notwithstanding the low mechanical advantage. In addition, during this initial extension of the frame links 26, the handle member 42 may be lifted substantially vertically wherein this vertical lifting is transmitted through the panel links 28 to vertically lift the vent panel 12 and correspondingly rotate the links 26 and 28 to rotational positions of increased mechanical advantage.

Further upward pushing on the handle member 42 pivots the links 26 and 28 toward their final open positions, wherein, in the illustrative embodiment as shown in FIG. 8, the panel links 28 conveniently extend through passages 76 formed between the outermost ends of the frame links 26 and a raised boss 78 on the handle portion 42 for locking interengagement of ears 80 on the panel links and with ears 82 on the frame links and raised boss. These interlocking sets of ears cooperate in holding the vent panel 12 in the open position irrespective of any vibrational forces which may be encountered from the vehicle. Conveniently, the ears 80 on the panel links 28 are formed on the outboard faces of resilient skirts 84 separated from the panel links by slits 87 to insure sufficient resiliency of movement for the ears 80 to lock and unlock with the ears 82.

Figure 5:
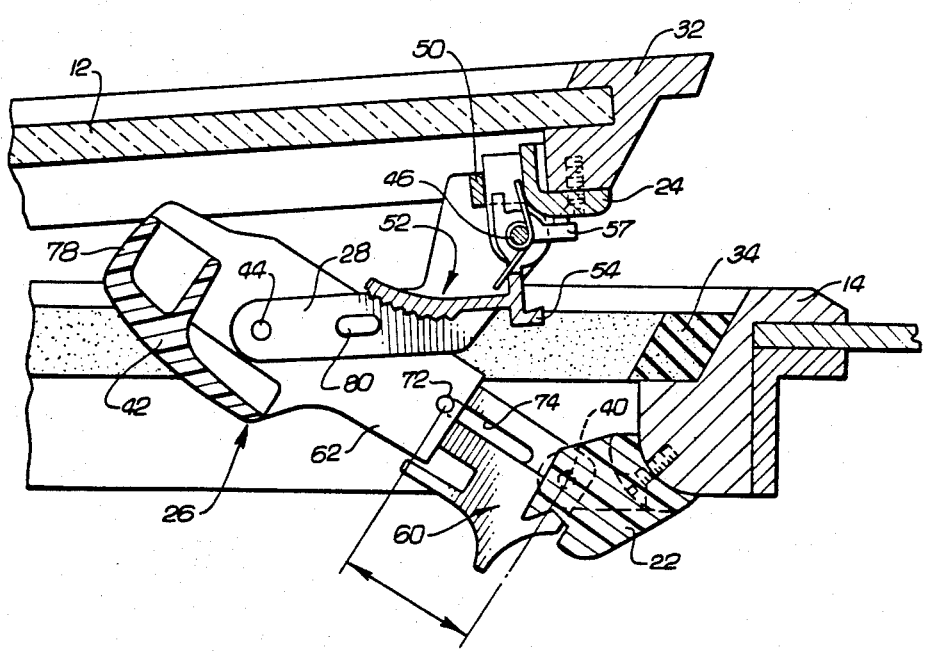
FIG. 5 is a fragmented vertical section of the latch assembly generally similar to FIG. 2 and illustrating the latch assembly in a partially open position.

The latch assembly 10 of this invention is returned to the closed position by pulling downwardly on the handle portion 42 thereby unlocking the interengaged ears 80 and 82 and pivoting the frame and panel links 26 and 28 back toward the closed position as shown in FIGS. 2 and 4. As these links approach an intermediate rotational position, as shown in FIG. 5, significant reaction forces arise between the pintles 40 and the pivot shaft 46 as a result of the links 26 and 28 having different lengths and pivoting about uncommon centers. These reaction forces, however, which are particularly significant generally in the plane of the vent frame 14 and which tend to force the adjacent edges of the vent frame 32 and main frame 14 away from each other, are controlled and limited by the compression springs 64. More specifically, the compression springs 64 compress in response to the reaction forces to adjust the effective lengths of the frame links 26 and correspondingly limit the reaction forces in accordance with the strength of the springs 64. Such force limitation importantly prevents distortion and/or damage to the vent frame 32 or the main frame 14 during opening and closing movement of the sunroof window.

Figure 9:
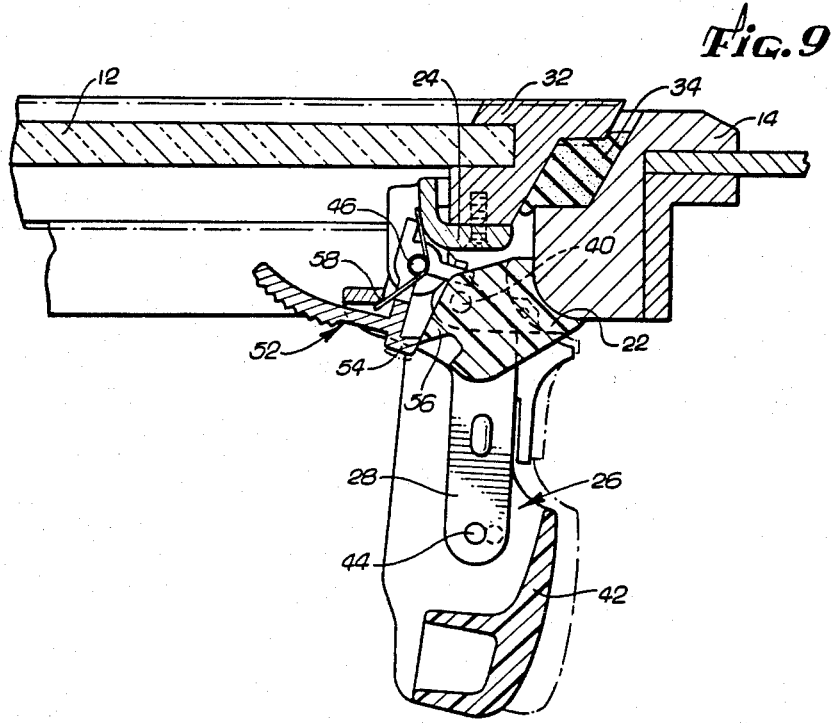
FIG. 9 is a fragmented vertical section of the latch assembly generally similar to FIG. 2 and illustrating movement of the latch assembly toward a closed and locked position.
Figure 10:
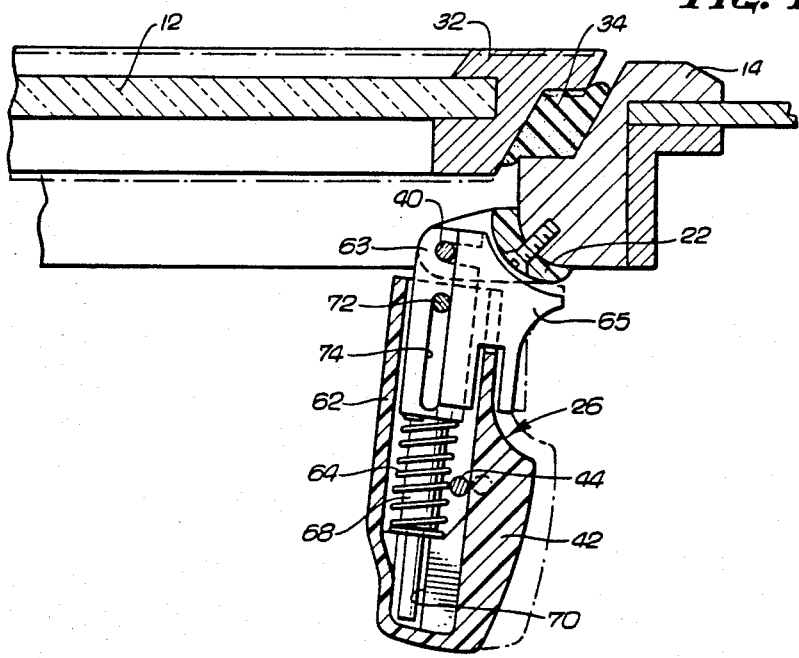
FIG. 10 is a fragmented vertical section of the latch assembly generally similar to FIG. 4 and illustrating movement of the latch assembly toward the closed and locked position.
Figure 13:
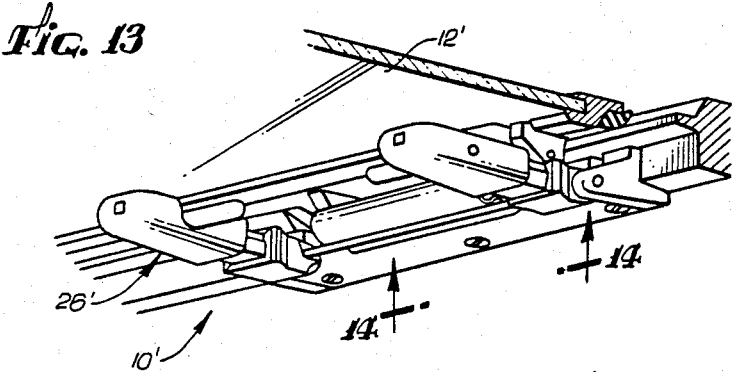
FIG. 13 is an enlarged fragmented perspective view illustrating an alternative form of a latch assembly embodying the novel features of the present invention in a closed and locked position, as viewed from the passenger compartment of a vehicle.

When the frame links 26 and panel links 28 are returned to the closed position, stops 91 on the panel bracket 24 move into contact with the adjacent cross bar 50 connected between the panel links 28 to retain the panel links 28 and frame links 26 is a normal closed position lying closely adjacent and substantially parallel with the overlying vent panel 12. However, the sealing gasket 34 will not be sufficiently compressed for the latch 54 on the latch plate 52 to return to locking engagement with the latch keeper 56. Latching is achieved by further downward pivoting movement of the links 26 and 28 and the handle member 42 substantially as a unit and without significant relative rotation between the frame and panel links, as shown in FIG. 9, until the links are oriented generally perpendicularly relative to the plane of the main frame 14. In this position, a continued downward pull on the handle member 42 applies a substantially downward force to the vent panel 12 to partially crush the sealing gasket thereby pulling the latch 54 downwardly into locking engagement with the keeper 56. Importantly, since the pivot shaft 46 is positioned relatively above the pintles 40, this downward pivoting motion is accompanied, as shown in FIG. 10, by progressive further reduction in the lengths of the frame links 26 and corresponding further compression of the compression springs 64. With this arrangement, when the handle member 42 is released after latching is achieved, the compression springs 64 partially extend to urge the links 26 and 28 to pivot back toward the closed position shown in FIG. 2 to lie substantially concealed with a relatively low profile closely adjacent and generally parallel with the vent panel 12 where they do not interfere with or project significantly into the passenger compartment.

In accordance with further features of the latch assembly 10 of this invention, the latch assembly is adapted for quick and easy disassembly to permit removal of the vent panel 12 from the main frame 14, if desired. More particularly, as shown best in FIGS. 3, 4, 11, and 12, the inner portion 60 of each frame link 26 is constructed from a clevis arm 61 having a downwardly open clevis 63 for receiving the associated pintle 40, wherein the clevis arm 61 extends telescopically into the outer section 62 of the frame link 26 and is engaged by the associated compression spring 64. A thumb actuated slide cover 65 also forming part of the inner link 60 is slidably carried on the clevis arm 61 for movement between a position closing the clevis 63 to prevent removal of the frame link 26 from the pintle and an alternative position opening the clevis to permit removal of the frame link 26 from the pintle. This movement of the slide cover 65 is conveniently a snap-action movement in accordance with tabs 85 on the slide cover 65 which snap-lock into appropriate detents 86 in the clevis arm 61, as viewed in FIG. 3.

Accordingly, the frame links 26 can be disconnected quickly and easily from the pintles 40 by moving the slide cover 65 to open the clevis 63, thereby permitting lifting and separation of the vent panel 12 from the main frame 14. The vent panel can then be removed entirely from the main frame by appropriate disassembly of the hinge structure along the forward edge of the vent panel, as is well understood by those skilled in the art and thus is not shown or described herein. Conveniently, however, stops 88 (FIG. 2) on the handle member 42 prevent rotation of the panel links 28 to an over-center position below the frame links 26 thereby supporting the links in the proper orientation relative to each other for reassembly of the latch assembly when the vent panel 12 is reinstalled into the vent bracket. Such reassembly is accomplished by reengaging the open clevises 63 with the pintles 40 and then snapping the slide covers 65 back to positions closing the clevises. Closing of the slide covers 65 may be conveniently accomplished by manually rotating the frame and panel links 26 and 28 to their downwardly projecting positions, as viewed in FIGS. 9 and 10, resulting in sufficient reduction in the lengths of the frame links 26 such that the outer sections 62 of the frame links bear against the slide covers 65 to push them upwardly to the positions closing the clevises.

The latch assembly 10 of this invention is thus quickly and easily operated from within the passenger compartment for moving the vent panel between open and closed positions while limiting and controlling reaction forces which could otherwise results in damage to the sunroof window. In the closed position, the entire latch assembly lies closely adjacent the vent panel where it does not significantly obstruct passenger headroom and wherein the handle member 42 which may be smoothly contoured provides the latch assembly with a smooth profile substantially free of protrusions which could cause serious injury to passengers in the event of a collision. Moreover, during movement between open and closed positions, the articulated links of the latch assembly do not project downwardly into the passenger compartment. The only time the links are required to move downwardly into the passenger compartment is during the brief interval for lockingly engaging the latch 54 with the keeper 56, and when engaged, the links are spring-biased for automatic return back to the low-profile, closed position lying against the underside of the vent panel.

An alternative form of the latch assembly of this invention is illustrated in FIGS. 13-16, wherein structural components indentical functionally with components shown and described with respect to FIGS. 1-12 are referred to by common primed reference numerals. As shown, the alternative latch assembly 10' comprises a pair of telescopic frame links 26' pivoted to a frame bracket 22' and to a respective pair of panel links 28' which are in turn pivotally secured with respect to a panel bracket 24'. In the modified embodiment, however, a handle member 42' is molded integrally between the panel links 28' instead of between the frame links, as described with respect to FIGS. 1-12, wherein the handle member 42' is readily grasped to move the links 26' and 28' between open and closed positions to correspondingly open and close a vent panel 12' relative to a main frame 14'. In addition, a modified latching mechanism is provided.

Figure 14:
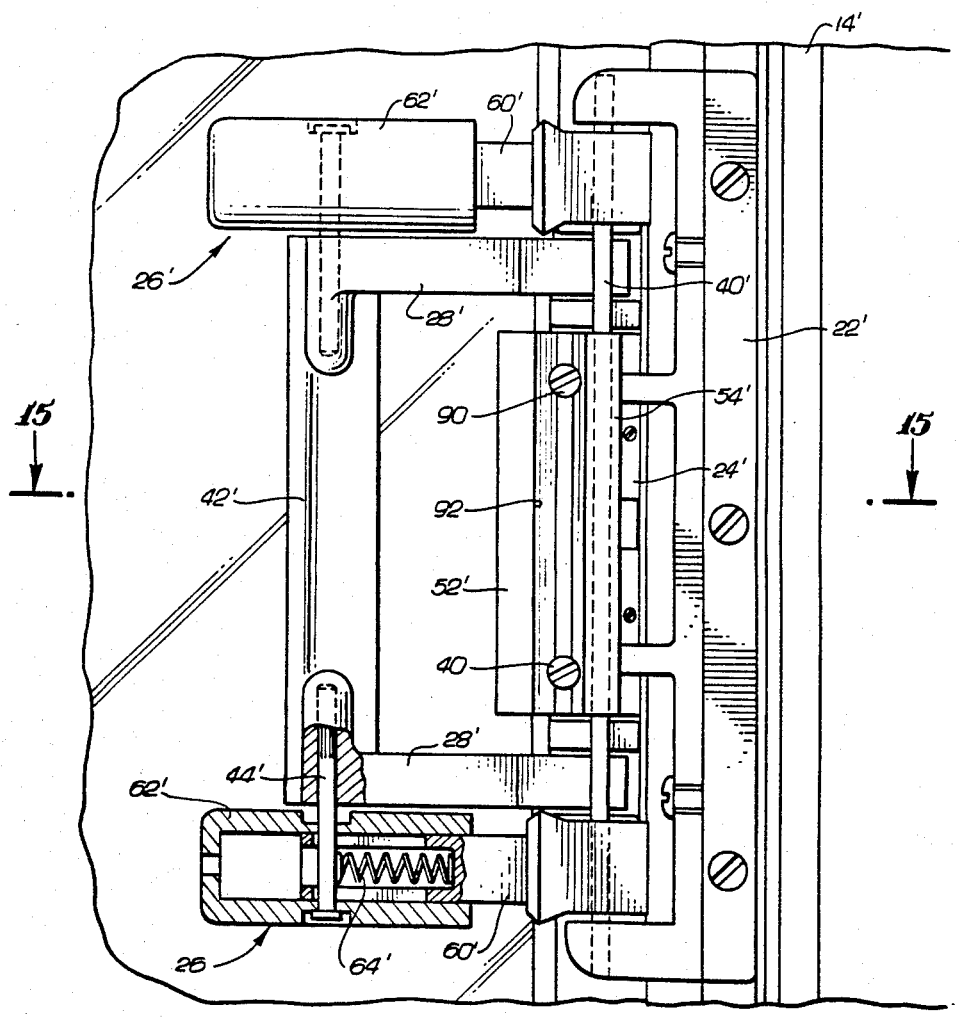
FIG. 14 is an enlarged fragmented bottom plan view taken generally on the line 14—14 of FIG. 13, with portions broken away to illustrate details of construction of the latch assembly.

More particularly, as shown in FIGS. 13-16, the vent bracket 22' is adapted for securement to the main frame 14' of a sunroof window or the like. The vent bracket 22' supports a transversely elongated pintle 40' to which the frame links 26' are pivotally connected. These frame links 26', as in the embodiment of FIGS. 1-12, include inner sections 60' which may be adapted for selective disengagement from the pintles and which are telescopically received into outer sections 62'. Hinge pins 44' pivotally connect these outer sections 62' to the panel links 28', and as shown in FIG. 14, compressions springs 64' within the outer sections 62' react between the hinge pins 44' and the inner sections 60' to urge the frame links toward normally fully extended positions.

The panel links 28' in turn have their ends opposite the hinge pins 44' secured to a pivot shaft 46' which also supports the panel bracket 24' secured with respect to the vent panel 12'. Accordingly, the frame and panel links 26' and 28' are coupled between the main frame 14' and the vent panel 12' and are adapted for articulated over-center movement between a closed position, as viewed in FIG. 15, and an open position, as viewed in FIG. 18.

In the closed position, the latch assembly 10' can be locked in place by a latch plate 52' in the form of a transversely elongated extruded strip or the like having a generally C-shaped cross section. This latch plate 52' includes an upper end pivotally carried by the pivot shaft 46' and blending downwardly into a smoothly contoured section opening toward the vent bracket 14'. The lower end of the latch plate terminates in an upwardly angled latch foot 54' positioned for locking engagement with a keeper defined by a central portion of the pintle 40' on the frame bracket 22'. A torsion spring 58' biases the latch plate 52' for movement rotating the latch foot 54' toward the pintle 40' and a pair of transversely spaced retainer screws 90 are secured generally between the upper and lower ends of the latch plate for controllably selecting, as desired, the vertical distance between the vent panel 12' and the pintle 40' when the vent panel is in the closed position. Conveniently, these retainer screws 90 project upwardly through the base of an upwardly recessed trough 92 provided to facilitate unlocking and opening movement of the latch assembly 10'.

Figure 16:
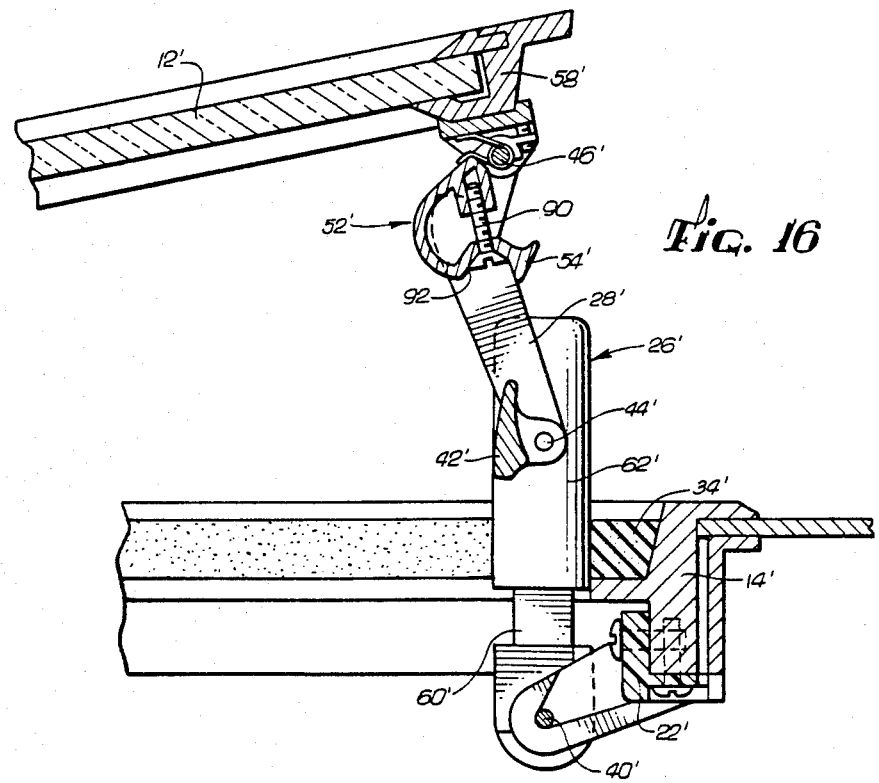
FIG. 16 is a fragmented vertical section generally similar to FIG. 15 and illustrating the latch assembly in an open position.

More particularly, when it is desirable to disengage the latch foot 54' from the pintle 40', the latch plate 52' may be bumped upwardly with a portion of the hand by one of the vehicle passengers to pivot the latch plate against the torsion spring 58' in a direction retracting the latch foot from the pintle. This movement is facilitated by the trough 92 providing an indentation into which the the hand can be pressed without slippage to unlock the latch assembly. The frame and panel links 26' and 28' can then be pivoted upwardly by pushing with the fingers of the same hand and in a single motion upon the handle member 42' which, in the present embodiment, is joined between the panel links 28' and contoured for ready engagement with the fingers. The links can be pushed downwardly, in the same manner as described with respect to FIGS. 1-12, until the links 26' and 28' move over-center. When this occurs, as shown in FIG. 16, the frame links 26' rest against the vent frame 14' to halt further rotation whereupon the links are maintained in the open position. Additional structural components such as interengaging tabs or the like (not shown), as illustrated with respect to the embodiment of FIGS. 1-12, may be provided if desired to further retain the links in the open position.

Figure 15:
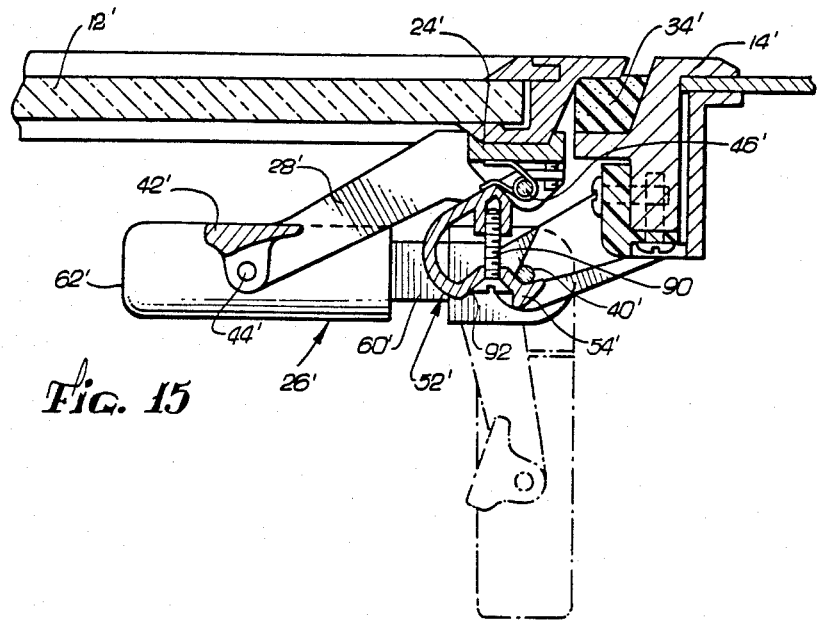
FIG. 15 is a fragmented vertical section taken generally on the line 15—15 of FIG. 14 and illustrating the latch assembly in a closed and locked position.

The frame and panel links 26' and 28' are returned to the closed position by pulling downwardly on the handle member 42'. During this downward movement, the telescopic frame links 26' partially retract as described with respect to FIGS. 1-12 to limit and control reaction forces which could otherwise damage the window. As shown in FIG. 15, the links may be pivoted downwardly beyond the closed position to extend generally perpendicular to the plane of the main frame 14' whereupon the links can be pulled downwardly to partially crush the sealing gasket 34' and reengage the latch foot 54' with the pintle 40'. Subsequent release of the handle member 42' permits the telescopic frame links 26' to partially extend thereby returning the links automatically to the closed position lying closely adjacent the vent panel 12'.

A variety of further modifications and improvements to the latch assembly of this invention, including adaption for a variety of operating environments other than sunroof windows, is believed to be apparent to those skilled in the art. Accordingly, no limitation on the invention is intended, except by way of the appended claims.

What is claimed is:

1. A latch assembly for controlling movement between open and closed positions of a vent panel relative to a main frame in a sunroof window or the like, comprising:

a frame bracket for securement with respect to the main frame;

a pair of frame links;

means for pivotally connecting said frame links generally at one end thereof in transversely spaced relation with respect to said frame bracket for generally coaxial pivoting movement;

a panel bracket for securement with respect to the vent panel;

a pair of panel links;

means for pivotally connecting said panel links generally at one end thereof in transversely spaced relation with respect to said panel bracket for generally coaxial pivoting movement;

means for pivotally connecting said frame links and said panel links respectively to each other generally at their respective other ends for generally coaxial pivoting movement;

said pairs of frame and panel links being sized and shaped for articulated over-center pivoting movement between a generally folded closed position with the vent panel lying generally in the plane of the vent frame and a generally end-to-end open position with the vent panel in an open position relative to the main frame;

each of said frame links including at least two longitudinally movable sections and a spring reacting therebetween urging said sections toward a fully extending position such that said frame links are adjustable in length during said articulated pivoting movement to limit the magnitude of forces reacting between said frame and panel brackets during such movement in accordance with the strength of said springs;

a handle member extending between said frame links at a position with said other ends of said panel links disposed between said handle member and said one ends of said frame links, said frame links and handle member cooperating to define passages through which said panel links extend when said frame and panel links are in said open position, and further including first tab means on said panel links interengageable with second tab means on said frame links and handle member for releasably locking said frame and panel links in said open position;

a spring-loaded latch carried by said panel bracket; and a latch keeper on said frame bracket, said latch and keeper being releasably interengageable when said frame and panel links are in said closed position to lock the vent panel in a closed position generally lying within the plane of the main frame.

2. The latch assembly of claim 1 wherein said first tab means are formed on resilient skirts carried by said panel links.

3. The latch assembly of claim 1 wherein said panel links have a length such that said springs reacting between said sections of said frame links are partially compressed when said frame and panel links are in said closed positions.

4. The latch assembly of claim 3 wherein said sections of each of said frame links include means for limiting the extent of permissible relative longitudinal movement therebetween.

5. The latch assembly of claim 3 wherein said one ends of said frame links are pivotally connected to said frame bracket on an axis spaced vertically below the pivot axis of said one ends of said panel links relative to said panel bracket when said frame and panel links are in said closed position.

6. The latch assembly of claim 5 wherein said frame and panel links are pivotally movable relative to said frame and panel brackets from said closed position downwardly to a position generally perpendicular to the plane of the main frame to permit exertion of a substantially downward force on said panel bracket by pulling downwardly on said handle member, said springs of said frame links being further compressed upon such downward pivoting and pulling movement whereby said frame and panel links are urged by said springs when said handle member is released to pivot together back to said closed position.

7. The latch assembly of claim 1 wherein said frame and panel links lie closely adjacent the vent panel in a plane generally parallel therewith when said frame and panel links are in said closed position.

8. The latch assembly of claim 1 wherein said latch is formed on a latch plate pivotally carried by said panel bracket, and further including a latch spring for urging said latch plate to pivot relative to said panel bracket in a direction biasing said latch toward said keeper.

9. The latch assembly of claim 8 wherein said latch plate is disposed transversely between said interconnected pairs of frame and panel links.

10. The latch assembly of claim 8 including means for adjustably controlling the degree of pivoting of said latch plate toward said keeper.

11. The latch assembly of claim 8 wherein said means for pivotally interconnecting said one ends of said frame links to said frame bracket comprises a transversely elongated pintle on said frame bracket, said keeper being defined by a portion of said pintle transversely between said frame links.

12. The latch assembly of claim 8 wherein said latch plate has a downwardly presented surface formed thereon for facilitated manual engagement for pivoting said latch plate away from said keeper to disengage said latch from said keeper.

13. The latch assembly of claim 1 wherein said means for pivotally connecting said one ends of said frame links to said frame bracket is releasable.

14. The latch assembly of claim 13 including means for retaining said frame and panel links against relative over-center movement when said frame links are released from said frame bracket.

15. A latch assembly for controlling movement between open and closed positions of a vent panel relative to a main frame in a sunroof window or the like, comprising:

a frame bracket for securement with respect to the main frame;
a pair of frame links;
means for pivotally connecting said frame links generally at one end thereof in transversely spaced relation with respect to said frame bracket for generally coaxial pivoting movement;
a panel bracket for securement with respect to the vent panel;
a pair of panel links;
means for pivotally connecting said panel links generally at one end thereof in transversely spaced relation with respect to said panel bracket for generally coaxial pivoting movement;
means for pivotally connecting said frame and said panel links respective to each other generally at their respective other ends of generally coaxial pivoting movement;
said pairs of frame and panel links being sized and shaped for articulated over-center pivoting movement between a generally folded closed position with the vent panel lying generally in the plane of the vent frame and a generally end-to-end open position with the vent panel in an open position relative to the main frame;
each of said frame links including at least two longitudinally movable sections and a spring reacting therebetween urging said sections toward a fully extended position such that said frame links are adjustable in length during said articulated pivoting movement to limit the magnitude of forces reacting between said frame and panel brackets during such movement in accordance with the strength of said springs;
a handle member extending between one of said pairs of frame and panel links, said panel links having a length such that said springs reacting between said sections of said frame links are partially compressed when said frame and panel links are in said closed positions, said sections of each of said frame links including means for limiting the extent of permissible relative longitudinal movement therebetween;
a spring-loaded latch carried by said panel bracket; and
a latch keeper on said frame bracket, said latch and keeper being releasably interengageable when said frame and panel links are in said closed position to lock the vent panel in a closed position generally lying within the plane of the main frame.

16. The latch assembly of claim 15 wherein said handle member extends between said frame links.

17. The latch assembly of claim 15 wherein said handle member extends between said panel links.

18. The latch assembly of claim 15 wherein said one ends of said frame links are pivotally connected to said frame bracket on an axis spaced vertically below the pivot axis of said one ends of said panel links relative to said panel bracket when said frame and panel links are in said closed position.

19. The latch assembly of claim 18 wherein said frame and panel links are pivotally movable relative to said frame and panel brackets from said closed position downwardly to a position generally perpendicular to the plane of the main frame to permit exertion of a substantially downward force on said panel bracket by pulling downwardly on said handle member, said springs of said frame links being further compressed upon such downward pivoting and pulling movement whereby said frame and panel links are urged by said springs when said handle member is released to pivot together back to said closed position.

20. The latch assembly of claim 15 wherein said frame and panel links lie closely adjacent the vent panel in a plane generally parallel therewith when said frame and panel links are in said closed position.

21. The latch assembly of claim 15 wherein said latch is formed on a latch plate pivotally carried by said panel bracket, and further including a latch spring for urging said latch plate to pivot relative to said panel bracket in a direction biasing said latch toward said keeper.

22. The latch assembly of claim 21 wherein said latch plate is disposed transversely said interconnected pairs of frame and panel links.

23. The latch assembly of claim 21 including means for adjustably controlling the degree of pivoting of said latch plate toward said keeper.

24. The latch assembly of claim 21 wherein said means for pivotally interconnecting said one ends of said frame links to said frame bracket comprises a transversely elongated pintle on said frame bracket, said keeper being defined by a portion of said pintle transversely between said frame links.

25. The latch assembly of claim 21 wherein said latch plate has a downwardly presented surface formed thereon for facilitated manual engagement for pivoting said latch plate away from said keeper to disengage said latch from said keeper.

26. The latch assembly of claim 15 wherein said means for pivotally connecting said one ends of said frame links to said frame bracket is releasable.

27. The latch assembly of claim 26 including means for retaining said frame and panel links against relative over-center movement when said frame links are released from said frame bracket.

28. A latch assembly for controlling movement between open and closed positions of a vent panel relative to a main frame in a sunroof window or the like, comprising:
a frame bracket for securement with respect to the main frame;
a pair of frame links;
means for pivotally connecting said frame links generally at one end thereof in transversely spaced relation with respect to said frame bracket for generally coaxial pivoting movement;
a panel bracket for securement with respect to the vent panel;
a pair of panel links;
means for pivotally connecting said panel links generally at one end thereof in transversely spaced relation with respect to said panel bracket for generally coaxial pivoting movement;
means for pivotally connecting said frame and said panel links respective to each other generally at their respective other ends for generally coaxial pivoting movement;
said pairs of frame and panel links being sized and shaped for articulated over-center pivoting movement between a generally folded closed position with the vent panel lying generally in the plane of the vent frame and a generally end-to-end open position with the vent panel in an open position relative to the main frame, said one ends of said frame links being pivotally connected to said frame bracket on an axis spaced vertically below the pivot axis of said one ends of said panel links relative to said panel bracket when said frame and panel links are in said closed position;
each of said frame links including at least two longitudinally movable sections and a spring reacting therebetween urging said sections toward a fully extended position such that said frame links are adjustable in length during said articulated pivoting movement to limit the magnitude of forces reacting between said frame and panel brackets during such movement in accordance with the strength of said springs;
a handle member extending between one of said pairs of frame and panel links;
a spring-loaded latch carried by said panel bracket; and
a latch keeper on said frame bracket, said latch and keeper being releasably interengageable when said frame and panel links are in said closed position to lock the vent panel in a closed position generally lying within the plane of the main frame.

29. A latch assembly for controlling movement between open and closed positions of a vent panel relative to a main frame in a sunroof window or the like, comprising:
a frame bracket for securement with respect to the main frame;
a pair of frame links;
means for pivotally connecting said frame links generally at one end thereof in transversely spaced relation with respect to said frame bracket for generally coaxial pivoting movement;
a panel bracket for securement with respect to the vent panel;
a pair of panel links;
means for pivotally connecting said panel links generally at one end thereof in transversely spaced relation with respect to said panel bracket for generally coaxial pivoting movement;
means for pivotally connecting said frame and said panel links respective to each other generally at their respective other ends for generally coaxial pivoting movement;
said pairs of frame and panel links being sized and shaped for articulated over-center pivoting movement between a generally folded closed position with the vent panel lying generally in the plane of the vent frame and a generally end-to-end open position with the vent panel in an open position relative to the main frame;
each of said frame links including at least two longitudinally movable sections and a spring reacting therebetween urging said sections toward a fully extended position such that said frame links are adjustable in length during said articulated pivoting movement to limit the magnitude of forces reacting between said frame and panel brackets during such movement in accordance with the strength of said springs;
a handle member extending between one of said pairs of frame and panel links;
a spring-loaded latch carried by said panel bracket; and
a latch keeper on said frame bracket, said latch and keeper being releasably interengageable when said frame and panel links are in said closed position to lock the vent panel in a closed position generally lying within the plane of the main frame, said frame and panel links lying closely adjacent the vent panel in a plane generally parallel therewith when said frame and panel links are in said closed position.

30. A latch assembly for controlling movement between open and closed positions of a vent panel relative to a main frame in a sunroof window or the like, comprising:
- a frame bracket for securement with respect to the main frame;
- a pair of frame links;
- means for pivotally connecting said frame links generally at one end thereof in transversely spaced relation with respect to said frame bracket for generally coaxial pivoting movement;
- a panel bracket for securement with respect to the vent panel;
- a pair of panel links;
- means for pivotally connecting said panel links generally at one end thereof in transversely spaced relation with respect to said panel bracket for generally coaxial pivoting movement;
- means for pivotally connecting said frame and said panel links respective to each other generally at their respective other ends for generally coaxial pivoting movement;
- said pairs of frame and panel links being sized and shaped for articulated over-center pivoting movement between a generally folded closed position with the vent panel lying generally in the plane of the vent frame and a generally end-to-end open position with the vent panel in an open position relative to the main frame;
- each of said frame links including at least two longitudinally movable sections and a spring reacting therebetween urging said sections toward a fully extended position such that said frame links are adjustable in length during said articulated pivoting movement to limit the magnitude of forces reacting between said frame and panel brackets during such movement in accordance with the strength of said springs;
- a handle member extending between one of said pairs of frame and panel links;
- a spring-loaded latch formed on a latch plate pivotally carried by said panel bracket; and
- a latch keeper on said frame bracket, said latch and keeper being releasably interengageable when said frame and panel links are in said closed position to lock the vent panel in a closed position generally lying within the plane of the main frame, said latch further including a latch spring for urging said latch plate to pivot relative to said panel bracket in a direction biasing said latch toward said keeper.

31. The latch assembly of claim 30 wherein said latch plate is disposed transversely between said interconnected pairs of frame and panel links.

32. The latch assembly of claim 30 including means for adjustably controlling the degree of pivoting of said latch plate toward said keeper.

33. The latch assembly of claim 30 wherein said means for pivotally interconnecting said one ends of said frame links to said frame bracket comprises a transversely elongated pintle on said frame bracket, said keeper being defined by a portion of said pintle transversely between said frame links.

34. The latch assembly of claim 30 wherein said latch plate has a downwardly presented surface formed thereon for facilitated manual engagement for pivoting said latch plate away from said keeper to disengage said latch from said keeper.

35. A latch assembly for controlling movement between open and closed positions of a vent panel relative to a main frame in a sunroof window or the like, comprising:
- a frame bracket for securement with respect to the main frame;
- a pair of frame links;
- means for pivotally and releasably connecting said frame links generally at one end thereof in transversely spaced relation with respect to said frame bracket for generally coaxial pivoting movement;
- a panel bracket for securement with respect to the vent panel;
- a pair of panel links;
- means for pivotally connecting said panel links generally at one end thereof in transversely spaced relation with respect to said panel bracket for generally coaxial pivoting movement;
- means for pivotally connecting said frame and said panel links respective to each other generally at their respective other ends for generally coaxial pivoting movement;
- said pairs of frame and panel links being sized and shaped for articulated over-center pivoting movement between a generally folded closed position with the vent panel lying generally in the plane of the vent frame and a generally end-to-end open position with the vent panel in an open position relative to the main frame;
- each of said frame links including at least two longitudinally movable sections and a spring reacting therebetween urging said sections toward a fully extended position such that said frame links are adjustable in length during said articulated pivoting movement to limit the magnitude of forces reacting between said frame and panel brackets during such movement in accordance with the strength of said springs;
- a handle member extending between one of said pairs of frame and panel links;
- a spring-loaded latch carried by said panel bracket;
- a latch keeper on said frame bracket, said latch and keeper being releasably interengageable when said frame and panel links are in said closed position to lock the vent panel in a closed position generally lying within the plane of the main frame; and
- means for retaining said frame and panel links against relative over-center movement when said frame links are released from said frame bracket.

* * * * *